(12) United States Patent
Okamura et al.

(10) Patent No.: US 9,016,987 B2
(45) Date of Patent: Apr. 28, 2015

(54) METHOD FOR PROCESSING DIFFICULT-TO-CUT CAST IRON

(75) Inventors: Katsumi Okamura, Itami (JP); Satoru Kukino, Itami (JP); Tomohiro Fukaya, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 304 days.

(21) Appl. No.: 13/504,422

(22) PCT Filed: Oct. 28, 2010

(86) PCT No.: PCT/JP2010/069172
§ 371 (c)(1),
(2), (4) Date: Apr. 26, 2012

(87) PCT Pub. No.: WO2011/052682
PCT Pub. Date: May 5, 2011

(65) Prior Publication Data
US 2012/0219373 A1   Aug. 30, 2012

(30) Foreign Application Priority Data

Nov. 2, 2009   (JP) ................................. 2009-251869

(51) Int. Cl.
*B23C 3/02*   (2006.01)
(52) U.S. Cl.
CPC ............... *B23C 3/02* (2013.01); *B23C 2222/14* (2013.01); *B23C 2226/125* (2013.01)
(58) Field of Classification Search
CPC ..................... B23C 2226/12; B23C 2226/125; B23C 2222/14; B23C 2220/52; B23C 3/00; B23C 3/02
USPC ............................ 409/131, 132; 407/118, 119
See application file for complete search history.

(56) References Cited

U.S. PATENT DOCUMENTS

| 5,890,847 | A | 4/1999 | Uesaka et al. |
| 7,758,976 | B2 * | 7/2010 | Kukino et al. ................ 428/698 |
| 8,142,119 | B2 * | 3/2012 | Volokh .......................... 409/132 |
| 8,256,092 | B1 * | 9/2012 | Woodruff et al. ............... 29/557 |

(Continued)

FOREIGN PATENT DOCUMENTS

| JP | 60-15109 | 1/1985 |
| JP | 1-316110 | 12/1989 |

(Continued)

OTHER PUBLICATIONS

Mitsubishi Tools News Solid CBN grade for cast iron, p. 1, Jun. 10, 2005.*

(Continued)

*Primary Examiner* — Daniel Howell
*Assistant Examiner* — Nicole N Ramos
(74) *Attorney, Agent, or Firm* — Venable LLP; Steven J. Schwarz; Tamatane J. Aga

(57) ABSTRACT

In a pilot hole of a workpiece made of a difficult-to-cut cast iron, a cutting tool having a leading end to which a cutting insert is attached is inserted to cut the surface of the wall of the pilot hole. At this time, the cutting tool rotates about an axis ($\alpha$) and also revolves about another axis ($\beta$), so that contouring is performed on the workpiece by the tool. The cutting insert is formed of a sintered body having a CBN content of not less than 85% by volume, and the cutting insert has a thermal conductivity of not less than 100 W/(mK).

3 Claims, 1 Drawing Sheet

(56) References Cited

U.S. PATENT DOCUMENTS

| | | | |
|---|---|---|---|
| 2002/0121167 A1* | 9/2002 | Yamashita et al. | 82/1.11 |
| 2005/0226691 A1* | 10/2005 | Park et al. | 407/119 |
| 2008/0193234 A1* | 8/2008 | Davancens et al. | 408/1 R |
| 2008/0254282 A1* | 10/2008 | Kukino et al. | 428/336 |
| 2008/0286558 A1 | 11/2008 | Kukino et al. | |

FOREIGN PATENT DOCUMENTS

| | | |
|---|---|---|
| JP | 8-039321 | 2/1996 |
| JP | 10-277831 | 10/1998 |
| JP | 11-347803 | 12/1999 |
| JP | 2000-042823 | 2/2000 |
| JP | 2006-181702 | 7/2006 |
| WO | WO-2007/039955 A1 | 4/2007 |
| WO | WO-2007/057995 A1 | 5/2007 |

OTHER PUBLICATIONS

Date on Mitsubishi Tools News Solid CBN grade for cast iron. Found by "right clicking" the document (PDF file) and clicking Document Properties.*

Mitsubishi Tools: News Solid CBN grade for cast iron machining—Document, p. 1, Jun. 13, 2005.*

Mitsubishi Tools: News Solid CBN grade for cast iron machining—Date (Found by "right clicking" the document above (PDF file) and clicking Document Properties), Jun. 13, 2005.*

* cited by examiner

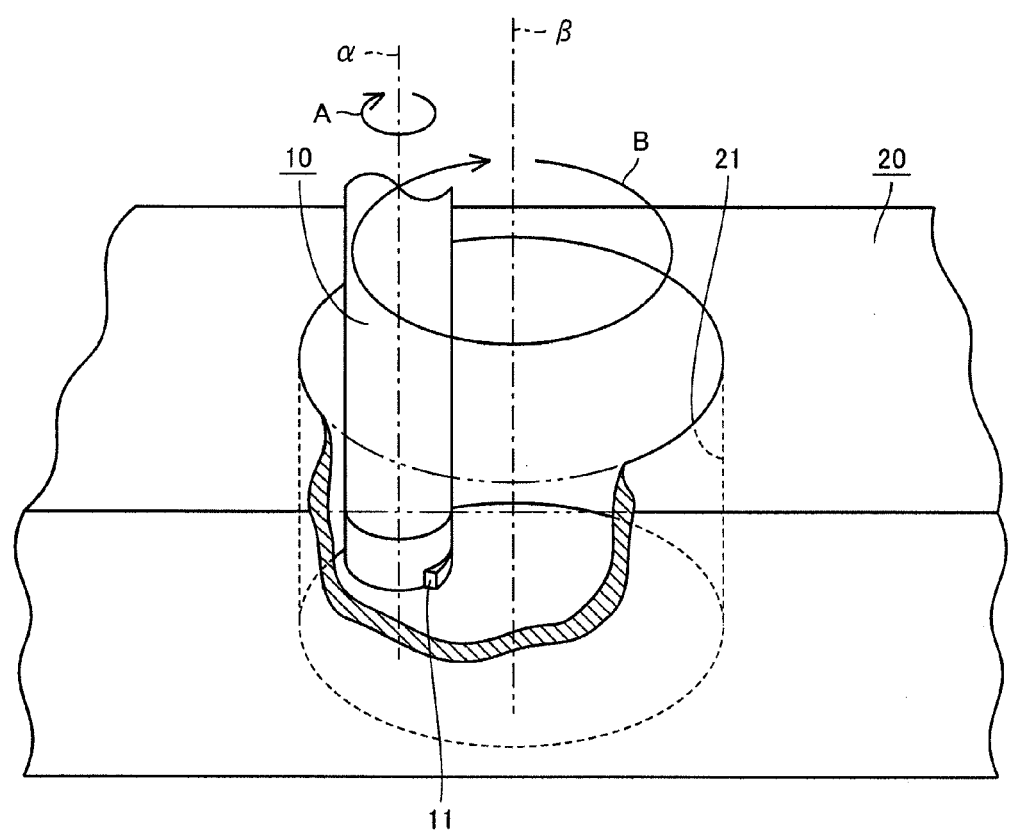

METHOD FOR PROCESSING DIFFICULT-TO-CUT CAST IRON

TECHNICAL FIELD

The present invention relates to a method for processing a difficult-to-cut cast iron. More specifically, the invention relates to a method for processing a difficult-to-cut cast iron when cutting the difficult-to-cut cast iron using a cutting insert containing CBN (Cubic Boron Nitride), by which extension of the life of the cutting insert and improvement of the cutting speed can both be achieved.

BACKGROUND ART

For cutting cast irons except for the FC material, namely materials such as the FCD, FCV, CGI, and ADI materials that are difficult-to-cut cast irons, generally low-speed processing (cutting speed V is 200 m/min or lower) is employed for which an insert coated with cemented carbide is used. In some cases, with the aim of improving the cutting speed, a cutting insert formed of a sintered body containing CBN (CBN sintered body) may be employed to cut a difficult-to-cut cast iron. Even if the cutting insert formed of a CBN sintered body is used, however, the cutting speed increased to 400 m/min or more will cause a rapid progression of wear and/or chipping of the cutting insert, resulting in a problem that cutting at a higher speed is difficult to achieve.

Further, in the case of cutting of the FC material (except for centrifugal cast iron), some manufacturers use a cutting insert formed of a CBN sintered body having a CBN content of 85% by volume or more, namely a so-called high-CBN-content sintered body, to practically perform high-speed continuous processing at cutting speed V of 1000 m/min or more. When the difficult-to-cut cast iron is cut, however, the temperature of the edge of the cutting insert is prone to increase while cutting is done. If a cutting insert is employed that is formed of a high-CBN-content sintered body with a high content of CBN having high reactivity with iron, wear of the cutting insert progresses at a considerably high rate. A resultant problem is therefore that, for cutting of the difficult-to-cut cast iron, the cutting insert formed of a high-CBN-content CBN sintered body is difficult to successfully employ. In order to avoid this problem, the difficult-to-cut cast iron is cut using a cutting insert formed of a sintered body of a ceramic material such as TiC (titanium carbide), $Al_2O_3$ (alumina), $Si_3N_4$ (silicon nitride), or SiAlON (sialon), or a CBN sintered body produced by mixing the powder of any of these ceramic materials and CBN particles and sintering them at an ultra-high pressure (so-called low-CBN-content CBN sintered body). The cutting speed, however, is still restricted to 400 m/min or less under the current circumstances as described above.

Meanwhile, contouring is known to cut a workpiece using a cutting tool having a cutting insert. Specifically, the cutting tool makes revolutions while rotating about its axis so that the cutting insert is intermittently brought into contact with the workpiece (see for example Japanese Patent Laying-Open Nos. 11-347803 (PTL 1) and 8-39321 (PTL 2)).

CITATION LIST

Patent Literature

PTL 1: Japanese Patent Laying-Open No. 11-347803
PTL 2: Japanese Patent Laying-Open No. 8-39321

SUMMARY OF INVENTION

Technical Problem

While employment of the contouring method disclosed in the above-referenced patent literatures may enable improvements such as improvement of the processing accuracy, the recent demands for high-efficiency processing and extended life of the cutting insert for cutting the difficult-to-cut cast iron are difficult to satisfy by employment of the contouring method only.

An object of the present invention is therefore to provide a method for processing a difficult-to-cut cast iron when cutting the difficult-to-cut cast iron, by which the extended life of the cutting insert and improvement of the processing efficiency can both be achieved.

Solution to Problem

A method for processing a difficult-to-cut cast iron according to the present invention includes the steps of: preparing a workpiece made of a difficult-to-cut cast iron; and cutting the workpiece using a cutting tool having a cutting insert. In the step of cutting the workpiece, the cutting tool revolves while rotating to allow the cutting insert to intermittently contact the workpiece. The cutting insert is formed of a sintered body having a CBN content of not less than 85% by volume. The cutting insert has a thermal conductivity of not less than 100 W/(mK).

The inventors of the present invention have conducted a detailed study of how to achieve both the extended life of the cutting insert and the improved processing efficiency in cutting a difficult-to-cut cast iron. Based on the finding that cutting speed V that is set to a low speed of 100 m/min or less provides a significant reduction of the wear rate of the cutting insert even in cutting a difficult-to-cut cast iron, the inventors have found that employment of a cutting insert formed of a high-thermal-conductivity CBN sintered body can be combined with contouring in which the cutting tool revolves while rotating so that the cutting insert is intermittently brought into contact with the workpiece, to thereby significantly reduce the wear rate of the cutting insert, and finally reached the present invention.

More specifically, the method for processing a difficult-to-cut cast iron of the present invention employs contouring in which the cutting tool revolves while rotating to thereby allow the cutting insert to intermittently contact the workpiece. Therefore, the cutting insert is repeatedly brought into a contact state where the insert contacts the workpiece and a non-contact state where it rotates and revolves without contacting the workpiece. As a result, the cutting insert having been heated while contacting the workpiece is cooled while making noncontact rotation and revolution, and accordingly an increase in temperature of the cutting insert when processing the workpiece is suppressed. Further, regarding the method for processing a difficult-to-cut cast iron of the present invention, the thermal conductivity of the cutting insert is set to a large value of 100 W/(mK) or more, and accordingly heat is efficiently dissipated from the cutting insert and thus the increase of the temperature of the cutting insert when processing the workpiece is suppressed to a greater extent. As a result, the cutting insert is cooled before the temperature of the insert is increased beyond its limit. Even in the case where a high cutting speed is used, a marked progression of wear is avoided that occurs to the cutting insert formed of a CBN sintered body due to reaction between the cutting insert and iron.

Meanwhile, since the method for processing a difficult-to-cut cast iron of the present invention employs contouring as described above, intermittent cutting causes impact to be repeatedly exerted on the cutting insert. In view of this, the cutting inert formed of a sintered body having a CBN content of 85% by volume or more is employed to improve the strength of the cutting insert and effectively suppress occurrence of damages such as chipping.

Thus, the method for processing a difficult-to-cut cast iron of the present invention enables both extension of the life of the cutting insert and improvement of the processing efficiency.

Here, regarding the method for processing a difficult-to-cut cast iron of the present invention described above, if the CBN content of the sintered body which forms the cutting insert is less than 85% by volume, the material strength against the above-described repeated impact is insufficient, which may cause damages such as chipping. The present invention therefore sets the CBN content to not less than 85% by volume. Further, regarding the method for processing a difficult-to-cut cast iron of the present invention described above, if the thermal conductivity of the cutting insert is less than 100 W/(mK), the cutting heat generated while the workpiece is being cut is less dissipated. Consequently, the range of the temperature in the thermal history is larger to cause thermal cracks in the cutting edge, which may possibly shorten the life that extends until chipping occurs. The present invention accordingly sets the thermal conductivity of the cutting insert to 100 W/(mK) or higher.

Preferably, regarding the above-described method for processing a difficult-to-cut cast iron, in the step of cutting the workpiece, X is not less than 0.2 µsec (microseconds) and not more than 2 µsec and X/Y is not less than 0.06 and not more than 0.16 where X is a contact time for which the cutting insert and the workpiece contact each other and Y is a noncontact time for which the cutting insert rotates and revolves without contacting the workpiece.

While the edge of the cutting insert and the workpiece contact each other, the cutting heat accumulates to cause the edge temperature to increase. In contrast, while the insert rotates and revolves without contacting the workpiece, the edge is cooled to have a reduced temperature. Here, in the case where cutting speed V is set to a low speed of 100 m/min or less as described above, the wear rate of the cutting insert in cutting a difficult-to-cut cast iron is significantly reduced. If, however, cutting speed V is reduced to an extremely low speed of 20 m/min or less for example, wear increases. Based on this finding and an assumption that a certain edge temperature actually provides a minimum wear rate, a variety of experiments have been conducted. As a result, an optimum contact time for which the cutting insert and the workpiece contact each other and an optimum noncontact time of the cutting insert and the workpiece have been found that enable an optimum edge temperature to be kept while achieving high-efficiency processing. Specifically, from the results of study by the inventors of the present invention, it has been revealed that X can be set to not less than 0.2 msec and not more than 2 µsec and X/Y can be set to not less than 0.06 and not more than 0.16 to thereby achieve high-efficiency processing while providing a significant reduction of the wear rate of the cutting insert.

Here, "contact time" of the present application means the time for which the cutting insert contacts the workpiece per rotation of the cutting tool. "Noncontact time" means the time for which the cutting insert and the workpiece are separated from each other (the time for which they do not contact each other) per rotation of the cutting tool.

Preferably, regarding the above-described method for processing a difficult-to-cut cast iron, the cutting insert has a thermal conductivity of not less than 120 W/(mK) and, in the step of cutting the workpiece, the cutting speed is not less than 1000 m/min.

The thermal conductivity of the cutting insert can be set to 120 W/(mK) or more to enable wear of the cutting insert to be suppressed to a sufficient extent, even if a cutting speed of 1000 m/min or more is used.

Preferably, regarding the above-described method for processing a difficult-to-cut cast iron, CBN particles constituting the cutting insert have an average particle size of not less than 3 µm. The average particle size of the CBN particles can be set to 3 µm or more to easily improve the thermal conductivity of the cutting insert.

Advantageous Effects of Invention

As clearly seen from the description above, the method for processing a difficult-to-cut cast iron of the present invention enables both the extended life of the cutting insert and the improved cutting speed in cutting the difficult-to-cut cast iron.

BRIEF DESCRIPTION OF DRAWINGS

FIG. 1 is a schematic diagram for illustrating a method for processing of the present invention.

DESCRIPTION OF EMBODIMENTS

An embodiment of the present invention will hereinafter be described based on the drawing, with reference to an example where a bore is made in a workpiece made of a difficult-to-cut cast iron. When a bore is to be made in the present embodiment, a workpiece made of a difficult-to-cut cast iron is first prepared. Specifically, as shown for example in FIG. 1, a workpiece 20 made of a difficult-to-cut cast iron such as the FCD, FCV, CGI, or ADI material in which a cylindrical pilot hole 21 is formed is prepared. Next, a cutting tool 10 having a leading end to which a cutting insert 11 is attached is inserted in this pilot hole 21 to cut the surface of the wall of pilot hole 21.

At this time, with reference to FIG. 1, cutting tool 10 rotates about an axis α, namely along an arrow A and also revolves about an axis β which coincides with the central axis of pilot hole 21, namely revolves along an arrow B. Accordingly, cutting insert 11 is intermittently brought into contact with the wall surface of pilot hole 21 to cut the wall surface. Namely, contouring is performed on workpiece 20 by tool 10.

Here, in the present embodiment, cutting insert 11 is formed of a sintered body having a CBN content of 85% by volume or more. Further, cutting insert 11 has a thermal conductivity of 100 W/(mK) or more.

In the process of making a bore of the present embodiment, contouring is performed in which cutting tool 10 revolves while rotating, so that cutting insert 11 is intermittently brought into contact with the wall surface of pilot hole 21 formed in workpiece 20. Thus, cutting insert 11 is repeatedly brought into the contact state where it contacts workpiece 20 and the noncontact state where it rotates and revolves without contacting workpiece 20. As a result, cutting insert 11 having been heated while contacting workpiece 20 is cooled while making noncontact rotation and revolution, and accordingly an increase in temperature of cutting insert 11 when processing the workpiece is suppressed. Regarding boring of the present embodiment, the thermal conductivity of cutting insert 11 is 100 W/(mK) or more, and thus heat is efficiently dissipated from cutting insert 11 and the increase of the temperature of cutting insert 11 when processing the workpiece is suppressed to a greater extent. As a result, cutting insert 11 is cooled before the temperature of the insert is increased beyond its limit. Even in the case where a high cutting speed is used, a marked progression of wear is avoided that occurs to cutting insert 11 formed of a CBN sintered body due to reaction between the cutting insert and iron.

Meanwhile, since a bore is made in the present embodiment by means of the contouring, intermittent cutting causes impact to be exerted repeatedly on cutting insert 11. However, cutting inert 11 formed of a sintered body having a CBN content of 85% by volume or more is employed to improve the strength of cutting insert 11 and effectively suppress occurrence of damages such as chipping. In this way, boring of the present embodiment achieves both extension of the life of the cutting insert and improvement of the processing efficiency.

Further, regarding boring of the present embodiment, contact time X for which cutting insert 11 and workpiece 20 contact each other and noncontact time Y are preferably set so that X is not less than 0.2 μsec and not more than 2 μsec and X/Y is not less than 0.06 and not more than 0.16. In this way, high-efficiency processing can be achieved while the wear rate of cutting insert 11 is remarkably reduced.

It is also preferable for boring of the present embodiment that the thermal conductivity of cutting insert 11 is not less than 120 W/(mK) and the cutting speed is not less than 1000 m/min. The thermal conductivity of cutting insert 11 is set to 120 W/(mK) or more to sufficiently suppress wear of cutting insert 11 and enhance the efficiency of processing, even when a cutting speed of 1000 m/min or more is used.

Further, it is preferable for boring of the present embodiment that the average particle size of the CBN particles constituting cutting insert 11 is not less than 3 μm. Thus, the thermal conductivity of cutting insert 11 can easily be improved.

Here, the thermal conductivity of cutting insert 11 can be improved by increasing the particle size of the CBN particles constituting cutting insert 11 for example as described above, and can also be improved by adjusting the composition of cutting insert 11. Specifically, it is effective to increase the content of the CBN particles having a higher thermal conductivity than that of a binder phase in cutting insert 11. A content of the CBN particles of 85% by volume or more allows the ratio of the CBN particles that contact each other to increase and thus improves the thermal conductivity. In order to further improve the thermal conductivity, the content of the CBN particles is preferably not less than 90% by volume. While the particle size of the CBN particles can be increased to easily improve the thermal conductivity, an excessively increased size of the CBN particles deteriorates the strength of cutting insert 11. It is therefore preferable that the particle size of the CBN particles is 20 μm or less, and the improvement of the thermal conductivity of cutting insert 11 is preferably achieved by increasing the content of the CBN particles that can simultaneously improve the strength and the thermal conductivity.

EXAMPLES

Example 1

In the following, Example 1 will be described. An experiment was conducted in which a cutting insert formed of a CBN sintered body was used to perform inner-periphery contouring and continuous inner-periphery cutting on a workpiece made of FCD450 which is a difficult-to-cut cast iron, and examine influences, on the amount of wear of the cutting insert, of the processing method, the CBN content of the cutting insert, and the thermal conductivity of the cutting insert. Table 1 shows conditions under which inner-periphery contouring was performed and Table 2 shows conditions under which continuous inner-periphery cutting was performed. Further, Table 3 shows the CBN content and the thermal conductivity of the cutting insert as well as the amount of wear of the flank face of the cutting insert at the time when the volume of a swarf removed from the workpiece by cutting had become 50 cm³. Here, as the cutting insert, Model No. CNGA120408 was employed. Further, a binder which is a component of the CBN sintered body of Examples A to C and Comparative Example A each contains at least WC, a Co compound, and an Al compound. In contrast, the binder of the CBN sintered body of Comparative Example B contains at least a Ti compound and an Al compound.

TABLE 1

| process inner diameter φ1 (mm) | cutter diameter φ2 (mm) | process length L (mm) | cutting speed V (m/min) | feed rate Fz (mm/rev) | feed f (mm/edge) | radial depth of cut ae (mm) | processing efficiency (cm³/min) |
|---|---|---|---|---|---|---|---|
| 100 | 85 | 100 | 1400 | 2 | 0.5 | 0.1 | 3.5 |

TABLE 2

| process inner diameter φ1 (mm) | cutter diameter φ2 (mm) | process length L (mm) | cutting speed V (m/min) | feed rate F (mm/rev) | feed f (mm/edge) | radial depth of cut ae (mm) | processing efficiency (cm³/min) |
|---|---|---|---|---|---|---|---|
| 100 | — | 100 | 350 | 0.1 | — | 0.1 | 3.5 |

TABLE 3

| | | cutting insert | | result |
|---|---|---|---|---|
| | processing method | CBN content (vol %) | thermal conductivity (W/mK) | amount of flank face wear (mm) |
| Example A | contouring | 85 | 100 | 0.052 |
| Example B | contouring | 90 | 120 | 0.045 |
| Example C | contouring | 95 | 140 | 0.038 |
| Comparative Example A | continuous cutting | 90 | 120 | 0.215 |
| Comparative Example B | contouring | 60 | 60 | 0.121 |

Referring to Table 3, from a comparison between Example B of the present invention and Comparative Example A falling out of the scope of the present invention in which the same cutting insert as that of Example B was used, it is seen that the amount of wear of the flank face in Example B is remarkably smaller than the amount of wear of the flank face in Comparative Example A, while respective processing efficiencies are identical to each other. The reason for this is assumed to be as follows. Regarding Example B in which contouring is employed, the contact time for which the edge of the cutting insert contacts the workpiece is a short time of a few microseconds or less, so that the cutting edge is cooled while the insert makes noncontact rotation and revolution before the temperature of the edge increases to exceed its limit. Therefore, the wear may be suppressed as compared with Comparative Example A in which the edge continuously contacts the workpiece. It has been confirmed from this result that contouring can be used for cutting of a difficult-to-cut cast iron by means of a cutting insert formed of a CBN sintered body to considerably reduce the wear rate of the cutting insert.

From a comparison between Examples A to C and Comparative Example B that all employ the contouring, it is also seen that the flank face of Comparative Example B wears to a greater extent. The reason for this is considered to be as follows. As for Comparative Example B, the thermal conductivity is less than 100 W/(mK), and therefore the edge temperature is prone to increase. In addition, since the CBN content is less than 85% by volume, the material strength is low and mechanical wear predominantly develops. In view of the above, it has been confirmed that, under the condition that contouring is used for cutting of a difficult-to-cut cast iron with a cutting insert formed of a CBN sintered body, the content of CBN of the cutting insert can be set to 85% by volume or more and the thermal conductivity can be set to 100 W/(mK) or more to thereby suppress wear of the cutting insert to a sufficient extent.

Further, as for Examples A to C, a higher CBN content and a higher thermal conductivity of the cutting insert provide a smaller amount of wear of the flank face. The reason for this is assumed to be as follows. A higher thermal conductivity allows heat to be dissipated to a greater extent and accordingly suppresses an increase of the edge temperature. Further, a higher CBN content provides a higher material strength to thereby suppress mechanical wear.

Example 2

Example 2 will be described next. An experiment was conducted in which a cutting insert formed of a CBN sintered body was used to perform inner-periphery contouring on a workpiece made of FC250 which is a difficult-to-cut cast iron, and examine influences, on the amount of wear of the cutting insert and generation of thermal cracks in the insert, of the average particle size of CBN and the thermal conductivity of the cutting insert, as well as the contact time for which the cutting insert and the workpiece contact each other and the noncontact time of the cutting insert and the workpiece. Table 4 shows details including cutting conditions, and Table 5 shows the average particle size of CBN constituting the cutting insert and the thermal conductivity of the cutting insert, as well as the amount of wear of the flank face and the number of thermal cracks of the cutting insert at the time when the volume of a swarf removed from the workpiece by being cut had become 50 cm$^3$. Contact time X and noncontact time Y of the cutting edge were changed by adjustment of the diameter of a cutter to be used. The binder which is a component of the CBN sintered body of Examples D to G each contains at least one selected from the group consisting of WC (tungsten carbide), a Co (cobalt) compound, and an Al (aluminum) compound.

TABLE 4

|  | process inner diameter φ1 (mm) | cutter diameter φ2 (mm) | process length L (mm) | cutting speed V (m/min) | feed rate Fz (mm/rev) | feed f (mm/edge) | radial depth of cut ae (mm) | processing efficiency (cm$^3$/min) | contact time X (μsec) | non-contact time Y (μsec) | X/Y |
|---|---|---|---|---|---|---|---|---|---|---|---|
| Example D | 100 | 65 | 100 | 1100 | 1 | 0.3 | 0.1 | 0.46 | 0.60 | 10.53 | 0.057 |
| Example E | 100 | 85 | 100 | 1100 | 1 | 0.3 | 0.1 | 0.82 | 1.12 | 13.45 | 0.083 |
| Example F | 100 | 96 | 100 | 1100 | 1 | 0.3 | 0.1 | 2.73 | 2.38 | 14.06 | 0.169 |
| Example G | 100 | 20 | 100 | 1100 | 1 | 0.3 | 0.1 | 0.66 | 0.19 | 3.24 | 0.059 |
| Comparative Example C | 100 | 96 | 100 | 1100 | 1 | 0.3 | 0.1 | 2.73 | 2.38 | 14.06 | 0.169 |

TABLE 5

|  | cutting insert | | | | results of cutting (when volume of removed swarf had become 50 cm$^3$) | |
|---|---|---|---|---|---|---|
|  | processing method | CBN content (vol %) | average size of CBN particles (μm) | thermal conductivity (W/mK) | amount of flank face wear (mm) | number of thermal cracks |
| Example D | contouring | 90 | 4 | 120 | 0.035 | 0 |
| Example E | contouring | 90 | 4 | 120 | 0.032 | 0 |
| Example F | contouring | 90 | 4 | 120 | 0.047 | 0 |
| Example G | contouring | 90 | 4 | 120 | 0.053 | 0 |
| Comparative Example C | contouring | 90 | 0.7 | 90 | 0.075 | 2 |

Referring to Tables 4 and 5, Example E in which contact time X is not less than 0.2 μsec and not more than 2 μsec and X/Y, which is the ratio of contact time X to noncontact time Y, is not less than 0.06 and not more than 0.16 provides a smallest amount of wear of the flank face in this experiment. As for Example D in which contact time X is also not less than 0.2 μsec and not more than 2 μsec but X/Y is out of the range of not less than 0.06 and not more than 0.16, Example D provides a second smallest amount of wear of the flank face next to above-described Example E. Further, in Examples F and G in which contact time X is out of the range of not less than 0.2 μsec and not more than 2 μsec and X/Y is also out of the range of not less than 0.06 and not more than 0.16, the amount of wear of the flank face is larger than that of the above-described Examples D and E. It has been confirmed from the results above that contact time X can be set to not less than 0.2 μsec and not more than 2 μsec and X/Y can be set to not less than 0.06 and not more than 0.16 to optimize the contact time for which the cutting insert and the workpiece contact each other and the noncontact time of the cutting insert and the workpiece, and thereby achieve high-efficiency processing while significantly reducing the wear rate of the cutting insert.

In Comparative Example C in which the average particle size of the CBN particles is 0.7 μm, the amount of wear of the flank face is to a similar extent to that of Example F in which the same processing conditions as Comparative Example C are used and the average particle size is 3 μm or more. In Comparative Example C, however, thermal cracks are made in the cutting edge. The reason for this is considered to be as follows. The cutting insert of Comparative Example C having finer CBN particles than the cutting insert of Example F has a lower thermal conductivity. Therefore, cutting heat that is generated when the workpiece is being cut is dissipated to a smaller extent in Comparative Example C as compared with Example F, and the range of the temperature in the thermal history of Comparative Example C is larger, resulting in thermal cracks in the cutting edge. It has been confirmed from this result that the average particle size of the CBN particles constituting the cutting insert can be set to 3 μm or more to improve the thermal conductivity of the cutting insert and suppress generation of thermal cracks in the cutting edge.

It should be construed that the embodiment and Examples disclosed herein are by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The method for processing a difficult-to-cut cast iron of the present invention is advantageously applicable, particularly to processing of a difficult-to-cut cast iron for which both extension of the life of the cutting insert and improvement of the cutting speed are required.

REFERENCE SIGNS LIST

10 cutting tool; 11 cutting insert; 20 workpiece; 21 pilot hole

The invention claimed is:

1. A method for processing a difficult-to-cut cast iron, comprising the steps of:
preparing a workpiece made of a difficult-to-cut cast iron; and
cutting said workpiece using a cutting tool having a cutting insert,
in said step of cutting said workpiece, said cutting tool revolving while rotating to allow said cutting insert to intermittently contact said workpiece,
said cutting insert being formed of a sintered body having a CBN content of not less than 85% by volume,
said cutting insert having a thermal conductivity of not less than 100 W/(mK),
in said step of cutting said workpiece, X is not less than 0.2 μsec and not more than 2 μsec and X/Y is not less than 0.06 and not more than 0.16 where X is a contact time for which said cutting insert and said workpiece contact each other and Y is a noncontact time for which said cutting insert rotates and revolves without contacting said workpiece, and
in said step of cutting said workpiece, a cutting speed is not less than 1000 m/min.

2. The method for processing a difficult-to-cut cast iron according to claim 1, wherein
said cutting insert has a thermal conductivity of not less than 120 W/(mK).

3. The method for processing a difficult-to-cut cast iron according to claim 1, wherein CBN particles constituting said cutting insert have an average particle size of not less than 3 μm.

* * * * *